US012610288B2

(12) United States Patent
Watfa et al.

(10) Patent No.: US 12,610,288 B2
(45) Date of Patent: Apr. 21, 2026

(54) EXTERNAL EXPOSURE OF CONTROL PLANE TO USER PLANE SWITCH PARAMETER

(71) Applicant: SAMSUNG ELECTRONICS CO., LTD., Suwon-si (KR)

(72) Inventors: Mahmoud Watfa, Staines (GB); Chadi Khirallah, Staines (GB); David Gutierrez Estevez, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 18/447,998

(22) Filed: Aug. 10, 2023

(65) Prior Publication Data

US 2024/0056904 A1     Feb. 15, 2024

(30) Foreign Application Priority Data

Aug. 10, 2022    (GB) ...................................... 2211689
Mar. 28, 2023    (GB) ...................................... 2304534

(51) Int. Cl.
   *H04W 76/20*        (2018.01)
   *H04W 36/00*        (2009.01)
(52) U.S. Cl.
   CPC ........ *H04W 36/0011* (2013.01); *H04W 76/20* (2018.02)
(58) Field of Classification Search
   CPC ........... H04W 52/367; H04W 72/1215; H04W 72/569; H04W 72/56; H04W 88/06;
   (Continued)

(56) References Cited

U.S. PATENT DOCUMENTS

2021/0037415 A1*   2/2021  Liu ......................... H04W 4/70
2021/0176117 A1*   6/2021  Zhang ...................... H04L 1/20
                           (Continued)

FOREIGN PATENT DOCUMENTS

CN        107277842 A      10/2017
CN        110636535 A      12/2019
                           (Continued)

OTHER PUBLICATIONS

3GPP TR 23.700-80 V0.3.0 (May 2022) Technical Report; 3rd Generation Partnership Project; Technical Specification Group Services and System Aspects; Study on 5G System Support for AI/ML-based Services (Release 18); 169 pages.
(Continued)

*Primary Examiner* — Nathan S Taylor

(57) ABSTRACT

The disclosure relates to a 5G or 6G communication system for supporting a higher data transmission rate. One or more network entities, such as a network function, a user equipment of a 3GPP communication network which use one or more expected CP to UP switch parameters which are one or more new parameters to inform the network about a CP to UP switch. An expected CP to UP switch parameter may be used to inform the network about an expected time of the CP to UP switch. The one or more expected CP to UP switch parameters may be exposed. An AF may provide the one or more expected CP to UP switch parameters to the network. An AI/ML AF may provide the one or more expected CP to UP switch parameters as part of AI/ML assisted parameters.

12 Claims, 5 Drawing Sheets

(58) Field of Classification Search

CPC ..... H04W 92/10; H04W 92/18; H04W 52/36; H04W 72/12; H04W 72/566; H04W 52/14; H04W 52/34; H04W 36/0011; H04W 76/20; H04W 24/02; H04W 24/04; H04W 28/26; H04W 64/006; H04W 84/18; H04W 36/00; H04W 8/20; H04L 5/00; H04L 41/16

See application file for complete search history.

(56) References Cited

U.S. PATENT DOCUMENTS

| | | | | |
|---|---|---|---|---|
| 2022/0117016 | A1* | 4/2022 | Velev | H04L 67/12 |
| 2023/0413059 | A1* | 12/2023 | Sharma | H04W 12/63 |
| 2023/0421448 | A1* | 12/2023 | Cui | H04L 41/12 |
| 2024/0259879 | A1* | 8/2024 | Ranganath | G06N 5/01 |
| 2024/0298194 | A1* | 9/2024 | Mueck | G06N 20/00 |
| 2024/0323828 | A1* | 9/2024 | Ianev | H04W 48/18 |
| 2025/0126444 | A1* | 4/2025 | Zhang | G06N 3/0464 |
| 2025/0151132 | A1* | 5/2025 | Kim | H04W 28/02 |
| 2025/0184707 | A1* | 6/2025 | Tamura | H04L 65/1104 |
| 2025/0184881 | A1* | 6/2025 | Olvera-Hernandez | H04L 67/51 |
| 2025/0317707 | A1* | 10/2025 | Manolakos | H04W 36/08 |

FOREIGN PATENT DOCUMENTS

| | | | | |
|---|---|---|---|---|
| EP | 3442290 | A1 | 2/2019 | |
| WO | WO-2021035206 | A1 * | 2/2021 | ........ H04W 28/0967 |
| WO | 2021185169 | A1 | 9/2021 | |

OTHER PUBLICATIONS

3GPP TS 22.261 V18.5.0 (Dec. 2021) Technical Specification; 3rd Generation Partnership Project; Technical Specification Group Services and System Aspects; Service requirements for the 5G system; Stage 1 (Release 18); 115 pages.

3GPP TS 23.501 V17.5.0 (Jun. 2022) Technical Specification; 3rd Generation Partnership Project; Technical Specification Group Services and System Aspects; System architecture for the 5G System (5GS); Stage 2 (Release 17); 568 pages.

3GPP TS 23.502 V17.3.0 (Dec. 2021) Technical Specification; 3rd Generation Partnership Project; Technical Specification Group Services and System Aspects; Procedures for the 5G System (5GS); Stage 2 (Release 17); 727 pages.

3GPP TS 24.501 V17.7.1 (Jun. 2022) Technical Specification; 3rd Generation Partnership Project; Technical Specification Group Core Network and Terminals; Non-Access-Stratum (NAS) protocol for 5G System (5GS); Stage 3; (Release 17); 946 pages.

Office Action dated Oct. 17, 2023, in connection with United Kingdom Patent Application No. 2304534.7, 6 pages.

International Search Report and Written Opinion of the International Searching Authority dated Nov. 6, 2023, in connection with International Application No. PCT/KR2023/011716, 7 pages.

Samsung, "KI#4: S01#36 updates to address remaining EN," SA WG2 Meeting #153E eMeeting, Elbonia, Oct. 2022, S2-2209920, 5 pages.

3GPP TR 23.700-80 V18.0.0 (Dec. 2022) Technical Report; 3rd Generation Partnership Project; Technical Specification Group Services and System Aspects; Study on 5G System Support for AI/ML-based Services (Release 18); 3 pages.

* cited by examiner

FIG. 1

EXTERNAL EXPOSURE OF CONTROL PLANE TO USER PLANE SWITCH PARAMETER

CROSS-REFERENCE TO RELATED APPLICATIONS

This application is based on and claims priority under 35 U.S.C. § 119 to GB Patent Application No. 2211689.1, filed on Aug. 10, 2022, and GB Patent Application No. 2304534.7 filed on Mar. 28, 2023, in the United Kingdom Intellectual Property Office, the disclosure of which are incorporated by reference herein in their entirety.

BACKGROUND

1. Field

Certain examples of the present disclosure provide various techniques relating to external exposure of one or more control plane (CP) to user plane (UP) switch parameters, for example within $3^{rd}$ generation partnership project (3GPP) 5th generation (5G) new radio (NR) and NR-based communication networks.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present disclosure is defined in the independent claims. Advantageous features are defined in the dependent claims. Embodiments or examples disclosed in the description and/or figures falling outside the scope of the claims are to be understood as examples useful for understanding the present disclosure.

Other aspects, advantages, and salient features of the present disclosure will become apparent to those skilled in the art from the following detailed description taken in conjunction with the accompanying drawings.

According to an aspect of the present disclosure there is provided one or more network entities, such as a network function, a user equipment of a 3GPP communication network which use one or more expected CP to UP switch parameters which are one or more new parameters to inform the network about a CP to UP switch.

According to certain embodiments the one or more network entities of the 3GPP communication network use an expected CP to UP switch parameter to inform the network about an expected time of the CP to UP switch.

According to certain embodiments the one or more network entities of the 3GPP communication network comprise a UE which uses the expected CP to UP switch parameter to inform the network about an expected time when the UE of the network requests to switch from data transmission over the CP to data transmission over the UP.

According to certain embodiments the one or more network entities of the 3GPP communication network comprise a UE which uses the expected CP to UP switch parameter to inform the network about a time when the UE which is using CP CIoT 5GS optimization or sending data over the CP switches to the UP or vice versa.

According to certain embodiments the one or more expected CP to UP switch parameters are exposed.

According to certain embodiments the one or more network entities of the 3GPP communication network comprise an AF which provides the one or more expected CP to UP switch parameters to the network.

According to certain embodiments the one or more network entities of the 3GPP communication network comprise an AI/ML AF which provides the one or more expected CP to UP switch parameters as part of AI/ML assisted parameters.

According to certain embodiments the one or more network entities of the 3GPP communication network comprise an SMF which uses the one or more expected CP to UP switch parameters to determine when a switch from CP to UP may be requested for communication.

According to certain embodiments the one or more network entities of the 3GPP communication network comprise an AF which provisions an expected CP to UP switch parameter and CP CIoT 5GS Optimisation is enabled and an SMF of the network leverages the provisioned parameter to optimize the timing of a switch to UP transmission by triggering a N3 data transfer establishment procedure.

According to certain embodiments the one or more expected CP to UP switch parameters are associated with any of an accuracy level, a probability level, a confidence range level, an evaluation metric level used to indicate an accuracy of the one or more expected CP to UP switch parameters.

According to certain embodiments the network chooses to use an expected CP to UP switch parameter based on any of the accuracy level, the probability level, the confidence range level, the evaluation metric level.

According to certain embodiments the level is any of preconfigured in the network, part of a local network policy, part of subscription information.

According to certain embodiments two or more expected CP to UP switch parameters per entry are received by an SMF of the network and the SMF chooses one of the received expected CP to UP switch parameters based on any of an associated probability assertion, an evaluation metric received for each parameter, local network policies, subscription information.

According to certain embodiments the one or more of the expected CP to UP switch parameters comprise a set of parameters which provide the network with information about the CP to UP switch.

According to certain embodiments the one or more network entities of the 3GPP communication network comprise any of an AMF, an SMF, an AMF and an SMF, a new NF for AI/MI, a CN function node.

According to certain embodiments the one or more expected CP to UP switch parameters are used to inform the network about any of a periodicity of the CP to UP switch, a duration of the CP to UP switch, a request for a release of UP resource in the UP to CP switch, a duration of UP resource use before release of the UP resource, a frequency or rate of CP to UP switching, an expected volume of data to be sent over the UP during the CP to UP switch, a direction of data sent over UP during the CP to UP switch, a trigger for the CP to UP switch, a volume of CP data trigger.

According to certain embodiments the one or more expected CP to UP switch parameters are used to inform the network about a UE CP to UP switch. According to certain embodiments the one or more expected CP to UP switch parameters are considered part of an expected UE behaviour parameter category. According to certain embodiments the one or more expected CP to UP switch parameters are sent to a UE and enforced at the UE.

According to certain embodiments the one or more expected CP to UP switch parameters are used to inform the network about a CP to UP switch request by an AF of the network.

According to an embodiment, a method performed by a node in a communication system may be provided.

According to an embodiment, the method may include transmitting request information associated with subscription.

According to an embodiment, the method may include after transmitting the request information, receiving a parameter indicating a time where to switch a control plane (CP) to a user plane (UP) for data transmission is requested by a UE.

According to an embodiment, the method may include identifying the time based on the parameter.

According to an embodiment, the parameter may be an artificial intelligence/machine learning (AI/ML) assisted parameter.

According to an embodiment, the time may be an expected time where to switch the CP to the UP for the data transmission is expected to be requested by the UE.

According to an embodiment, the request information may be transmitted to a unified data management (UDM).

According to an embodiment, the parameter may be used by a session management function (SMF).

According to an embodiment, the parameter may be associated with at least one of a probability level or an accuracy level.

According to an embodiment, in case that a plurality of parameters associated with the time are received, the parameter is identified based on the at least one of the probability level or the accuracy level.

According to an embodiment, a node in a communication system may be provided.

According to an embodiment, the node may include a transceiver; and a processor coupled with the transceiver.

According to an embodiment, the processor may be configured to transmit request information associated with subscription.

According to an embodiment, the processor may be configured to after transmission of the request information, receive a parameter indicating a time where to switch a control plane (CP) to a user plane (UP) for data transmission is requested by a UE.

According to an embodiment, the processor may be configured to identify the time based on the parameter.

According to an embodiment, a method performed by a node in a communication system may be provided.

According to an embodiment, the method may include obtaining a parameter indicating a time where to switch a control plane (CP) to a user plane (UP) for data transmission is requested by a user equipment (UE).

According to an embodiment, the method may include transmitting information on the parameter.

According to an embodiment, a node in a communication system may be provided.

According to an embodiment, the node may include a transceiver; and a processor coupled with the transceiver.

According to an embodiment, the processor may be configured to obtain a parameter indicating a time where to switch a control plane (CP) to a user plane (UP) for data transmission is requested by a user equipment (UE).

According to an embodiment, the processor may be configured to transmit information on the parameter.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates one example for procedures/steps for one or more expected CP to UP switch parameters according to embodiments of the present disclosure;

DETAILED DESCRIPTION

Figure 1:
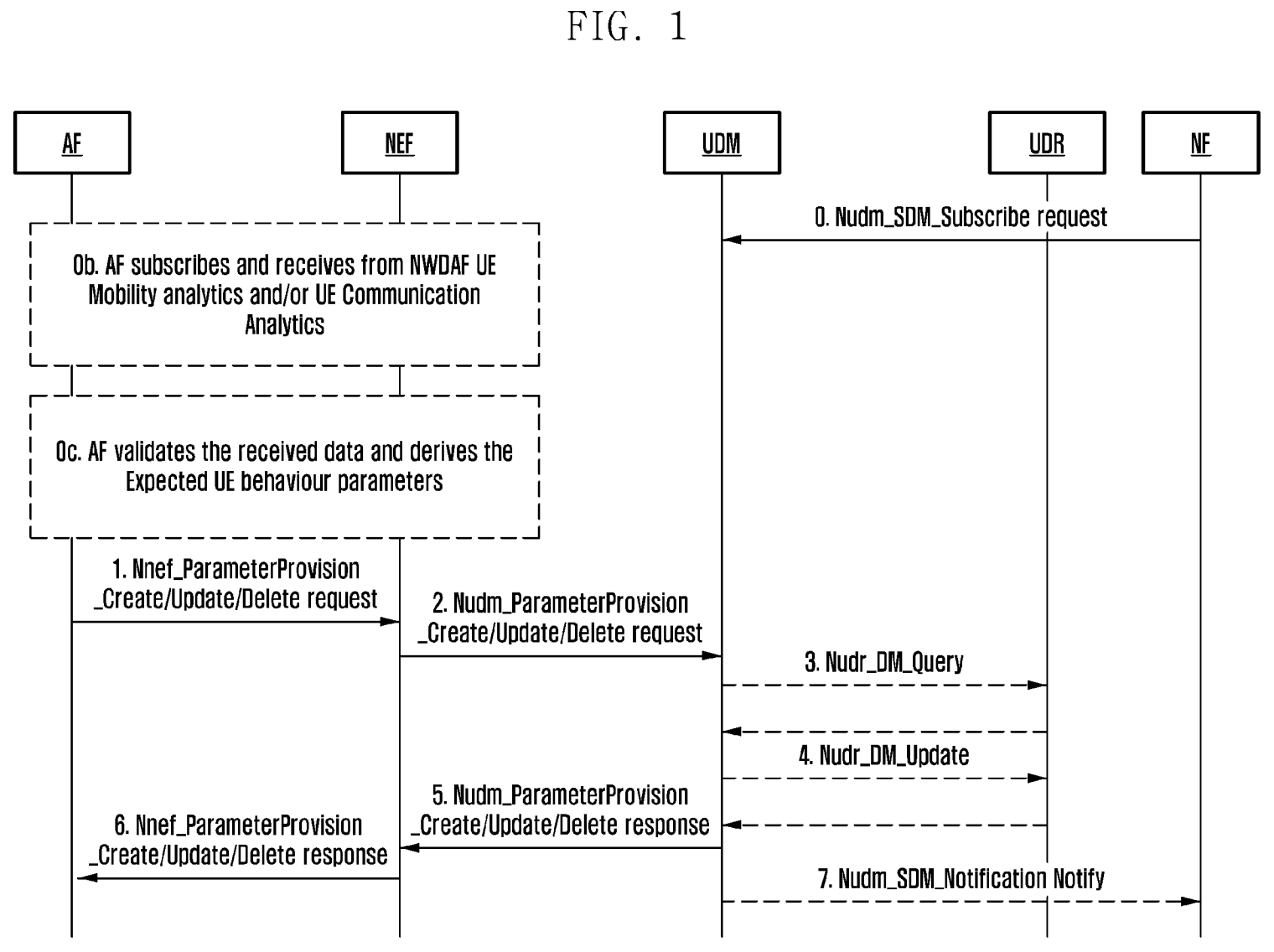
Figure 2:
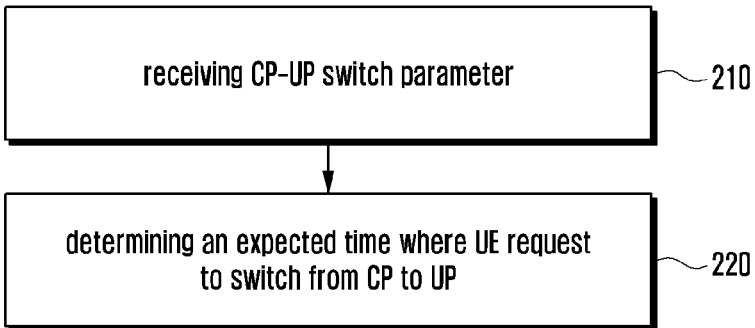
FIG. 2 illustrates an example of method performed by a node according to embodiments of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made.

The following examples are applicable to, and use terminology associated with, 3GPP 5G. However, the skilled person will appreciate that the techniques disclosed herein are not limited to these examples or to 3GPP 5G, and may be applied in any suitable system or standard, for example one or more existing and/or future generation wireless communication systems or standards. The skilled person will appreciate that the techniques disclosed herein may be applied in any existing or future releases of 3GPP 5G NR or any other relevant standard.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network.

The skilled person will appreciate that the present disclosure is not limited to the specific examples disclosed herein. For example, the techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

In 3GPP5GNR, 3GPP 5G Release 16 has been frozen and work on Release 17 is currently underway.

Artificial intelligence (AI)/machine learning (ML) is being used in a range of application domains across industry sectors. In mobile communications systems, mobile devices (e.g., smartphones, automotive, robots) are increasingly replacing conventional algorithms (e.g., speech recognition, image recognition, video processing) with AI/ML models to enable applications. The 5G system can at least support three types of AI/MIL operations, TS 22.261:

AI/ML operation splitting between AI/ML endpoints;

AI/ML model/data distribution and sharing over the 5G system; and

Distributed/Federated Learning over 5G system.

Exposure in communication networks means making network capabilities, such as data and network services, easily available for customers and partners. External exposure of capabilities of network functions is supported in 5G systems (5GS). External exposure can be categorized as Monitoring capability, Provisioning capability, Policy/Charging capability, network status reporting capability and Analytics reporting capability. Provisioning capability allows an external party to provision information which can be used for a UE in a 5GS.

As illustrated in TS 23.502, provisioning capability allows an external party to provision information, such as expected user equipment (UE) behaviour and service specific parameters, to 5G network functions. For example, the expected UE behavioural information consists of information on expected UE movement and communication characteristics. Provisioned data can be used by other network functions (NFs). The expected UE behaviour parameters characterise the foreseen behaviour of a UE or a group of UEs.

The 3GPP system currently supports exposure of parameters, examples of which are listed above. The following table is from TS 23.502, which shows the current parameters that are exposed, with respect to expected UE behaviour parameters. This is one set of parameters that can be exposed.

| Expected UE Behaviour parameter | Description |
| --- | --- |
| Expected UE Moving Trajectory | Identifies the UE's expected geographical movement<br>Example: A planned path of movement |
| Stationary Indication | Identifies whether the UE is stationary or mobile [optional] |
| Communication Duration Time | Indicates for how long the UE will normally stay in CM-Connected for data transmission.<br>Example: 5 minutes.<br>[optional] |
| Periodic Time | Interval Time of periodic communication<br>Example: every hour.<br>[optional] |
| Scheduled Communication Time | Time and day of the week when the UE is available for communication.<br>Example: Time: 13:00-20:00, Day: Monday.<br>[optional] |
| Battery Indication | Identifies power consumption criticality for the UE: if the UE is battery powered with non-rechargeable/non replaceable battery, battery powered with rechargeable/replaceable battery, or not battery powered.<br>[optional] |
| Traffic Profile | Identifies the type of data transmission: single packet transmission (UL or DL), dual packet transmission (UL with subsequent DL or DL with subsequent UL), multiple packets transmission<br>[optional] |
| Scheduled Communication Type | Indicates that the Scheduled Communication Type is Downlink only or Uplink only or Bidirectional [To be used together with Scheduled Communication Time]<br>Example: <Scheduled Communication Time>, DL only.<br>[optional] |
| Expected Time and Day of Week in Trajectory | Identifies the time and day of week when the UE is expected to be at each location included in the Expected UE Moving Trajectory.<br>[optional] |

The expected UE moving trajectory and the expected time and day of week in trajectory may be used by the access and mobility management function (AMF). All other parameters may be used by the AMF and by the session management function (SMF). The scheduled communication type and the traffic profile may not be used by the AMF to release the UE when network access server (NAS) release assistance information from the UE is available.

In the case of narrowband Internet of Things (NB-IoT) UEs, the expected UE behaviour parameters may be forwarded to the radio access network (RAN) to allow optimisation of Uu resource allocation for NB-IoT UE differentiation.

It should be noted that other parameters are also exposed, however they do not fall under the category of expected UE behaviour parameters.

The expected UE behaviour parameters listed above, although beneficial and advantageous, do not fulfil the requirements of emerging features or use cases. In fact these parameters may not fulfil all the current use cases in a communication network, let alone those that may be used for AI/ML.

To give an example, there are IoT devices that use the CP (e.g., network access server (NAS) messages) to send data. Such devices may also support the transfer of data over the UP. As such, these devices may start by sending data over the CP, e.g., where the data may be small in volume and also infrequent. However, on particular occasions, these devices may request the transfer of data over the UP, when there is a larger (than usual) amount of data to send. In these cases, it may be preferable to use the UP so as to not congest the CP network nodes like the AMF and/or SMF.

There is no parameter that is currently exposed in order to notify a network about when a UE may actually request to switch from transmission of data over the CP to transmission of data over the UP. This information may be useful for the network, as the expected UE behaviour, e.g., in terms of this CP to UP switch, can help the network to take certain actions for optimal operation.

The knowledge of a UE CP to UP switch may be useful in general, however it may also be particularly useful for IoT devices that run AI/ML applications, where the switch may be needed to, for example, receive training data and/or send inference data, where this data may have a larger than usual volume, such that it would be better to send it over the UP. For example, if a network knows when an IoT UE may request a switch from CP to UP, then the network can predict that more UP resources may be needed at that time. So, the network may attempt to reserve the resources in advance. Otherwise, the network may reject a CP to UP switch request if there is not enough resources and this leads to negative results on the service being used. The lack of CP to UP switch information may therefore cause negative user experience or negative quality of service for the applications that run on IoT UEs.

The current parameters which are exposed by the 3GPP system are not sufficient to address all use cases, especially those that are related to the IoT in general, and those that may be specific to AI/ML applications for IoT devices.

One or more network entities, such as a network function, a user equipment of a 3GPP communication network use one or more expected CP to UP switch parameters which are one or more new parameters to inform the network about a CP to UP switch. The one or more network entities may comprise any of an AMF, an SMF, an AMF and an SMF, a new NF for AI/ML, a CN function node.

The one or more expected CP to UP switch parameters are as defined herein.

The one or more expected CP to UP switch parameters may be considered standalone parameters. The one or more expected CP to UP switch parameters may be considered part of an expected UE behaviour parameter category. The one or more expected CP to UP switch parameters may be considered part of any other parameter categories that are exposed.

An expected CP to UP switch parameter may be used to inform the network about an expected time of the CP to UP switch. The expected CP to UP switch parameter may be used to inform the network about an expected time when a UE of the network requests to switch from data transmission over the CP to data transmission over the UP. The expected CP to UP switch parameter may be used to inform the network about a time when a UE, which is using CP CIoT 5GS optimization or sending data over the CP, switches to the UP or vice versa.

The one or more expected CP to UP switch parameters may be used to inform the 3GPP communication network about a periodicity of the CP to UP switch. The one or more expected CP to UP switch parameters may be used to inform the 3GPP communication network that the CP to UP switch is periodic. The one or more expected CP to UP switch parameters may be used to inform the 3GPP communication network of a periodicity of the CP to UP switch. The periodicity of the CP to UP switch may be any of every 1 hour, every 20 mins. It will be appreciated that these are examples only and are best expected information and may not be a 100% accurate.

The one or more expected CP to UP switch parameters may be used to inform the 3GPP communication network about a duration of the CP to UP switch. The duration of the CP to UP switch may be a time for which the CP to UP switch is expected to last.

The one or more expected CP to UP switch parameters may be used to inform the 3GPP communication network about a request for a release of UP resource in the UP to CP switch. The request for release of UP resource in the UP to CP switch may comprise an indicator for the 3GPP communication network to release UP resource after an expected duration of the CP to UP switch. The indicator may cause the 3GPP communication network to start a timer on success of the CP to UP switch by setup of the UP resource. The 3GPP communication network may release the UP resource on expiry of the timer. The timer may have an expiry time value which is a fixed value. The timer may have an expiry time value which is set to a value provided by an AF.

The one or more expected CP to UP switch parameters may be used to inform the 3GPP communication network of information about a duration of UP resource use before release of the UP resource. The information about the duration of UP resource may comprise a timer which runs for a duration of time in which the UP resource may be kept for use and after which the network may release the UP resource. This switch parameter may be used in conjunction with the previous switch parameter.

The one or more expected CP to UP switch parameters may be used to inform the 3GPP communication network about a frequency or rate of CP to UP switching. The frequency or rate of the CP to UP switching may be an expected frequency or rate of CP to UP switching for a given duration. This may comprise, for example, N CP to UP switches per a given time unit T, where N is any positive integer and T is any time unit.

The one or more expected CP to UP switch parameters may be used to inform the 3GPP communication network about an expected volume of data to be sent over the UP during the CP to UP switch. Any units can be used to refer to this parameter, e.g., kilobits per second, megabits per second, number of packets, total number of bits or bytes to be transferred, etc.

The one or more expected CP to UP switch parameters may be used to inform the 3GPP communication network about a direction of data sent over UP during the CP to UP switch. The direction of data sent over the UP may be any of uplink direction only, downlink direction only, both uplink and downlink directions. The direction of data may be an expected direction of data transmission over the UP.

The one or more expected CP to UP switch parameters may be used to inform the 3GPP communication network about a trigger for the CP to UP switch. The trigger for the CP to UP switch may indicate when the 3GPP communication network may take a decision to perform a CP to UP switch. The 3GPP communication network may take a decision to perform a CP to UP switch even if a UE of the network did not request a switch. A timer trigger may define a time when the communication network may take a decision to perform a CP to UP switch.

The timer trigger may be represented by a subset of any of the previous parameters. For example, the timer trigger may be represented by any of the listed examples or any of the parameters provided herein. The time trigger may be used in conjunction with any other parameter.

The one or more expected CP to UP switch parameters may be used to inform the 3GPP communication network about a volume of CP data trigger. The volume of CP data trigger may be a volume of data sent over the CP which when reached triggers a CP to UP switch. The volume of data may be defined in different ways such as, but not limited to, any of the number of CP transmissions, the rate of CP transmissions, the volume of the data content (e.g., X megabytes, etc, where X may be a real number and may refer to different units, etc.).

The one or more expected CP to UP switch parameters may be exposed.

One or more of the expected CP to UP switch parameters may comprise a set of parameters which provide the network with information about the CP to UP switch.

The set of expected CP to UP switch parameters may comprise an expected CP to UP switch parameter used to inform the communication network about an expected time of the CP to UP switch and one or more further expected CP to UP switch parameters. The further expected CP to UP switch parameters may be any of an expected CP to UP switch parameter used to inform the 3GPP communication network about a periodicity of the CP to UP switch, an expected CP to UP switch parameter used to inform the 3GPP communication network about a duration of the CP to UP switch, an expected CP to UP switch parameter used to inform the 3GPP communication network about a request for a CP to UP switch, an expected CP to UP switch parameter used to inform the 3GPP communication network about a duration of UP resource use before release of the UP resource, an expected CP to UP switch parameter used to inform the 3GPP communication network about a frequency or rate of CP to UP switching, an expected CP to UP switch parameter used to inform the 3GPP communication network about an expected volume of data to be sent over the UP during the CP to UP switch, an expected CP to UP switch parameter used to inform the 3GPP communication network about a direction of data sent over UP during the CP to UP switch, an expected CP to UP switch parameter used to inform the 3GPP communication network about a trigger for the CP to UP switch, an expected CP to UP switch parameter used to inform the 3GPP communication network about a volume of CP data trigger.

The one or more expected CP to UP switch parameters may be used to inform the 3GPP communication network about a UE CP to UP switch. The UE of the network may be using CP Consumer IoT (CIoT) 5GS optimization. The UE of the network may be sending data over the CP and may also support sending of data over the UP. The one or more expected CP to UP switch parameters may provide information concerning expected behaviour of the UE of the network.

The one or more expected CP to UP switch parameters may be applied to any Core Network (CN) function node, such as any of the AMF, the SMF, both the AMF and the SMF, a Network Function (NF) for AI/ML. The one or more expected CP to UP switch parameters may be applied to any other related features that may take advantage of the provided parameters. The one or more expected CP to UP switch parameters may be sent to any NF, such as any of the AMF, the SMF. The one or more expected CP to UP switch parameters may be enforced in the NF.

The one or more network entities may comprise an SMF which uses the one or more expected CP to UP switch parameters to determine when a switch from CP to UP may be requested for communication. The one or more network entities may comprise a preceding claim comprising an AF, which provisions an expected CP to UP switch parameter and CP CIoT 5GS Optimisation is enabled, an SMF of the network leverages the provisioned parameter to optimize the timing of a switch to UP transmission by triggering a N3 data transfer establishment procedure. The N3 data transfer establishment procedure is described in TS 23.501 and TS 23.502.

The one or more expected CP to UP switch parameters can be associated with any of an accuracy level, a probability level, a confidence range level, an evaluation metric level used to indicate an accuracy of the one or more expected CP to UP switch parameters. The 3GPP communication network can choose to use an expected CP to UP switch parameter based on any of the accuracy level, the probability level, the confidence range level, the evaluation metric level. The level may be any of preconfigured in the network, part of a local network policy, part of subscription information.

An SMF of the network may receive more than one expected CP to UP switch parameter per entry, and the SMF, for example, can choose one of the received expected CP to UP switch parameters based on any of an associated probability assertion, an evaluation metric received for each parameter, local network policies, subscription information.

The one or more network entities of the 3GPP communication network may comprise an AF which provides the one or more expected CP to UP switch parameters to the network. The one or more network entities of the 3GPP communication network may comprise an AI/ML AF which provides the one or more expected CP to UP switch parameters as part of AI/ML assisted parameters.

Any of the expected CP to UP switch parameters provided herein may also be defined as new subscription information, e.g., in the UDM, where each of the parameters may be forwarded to the AMF, or SMF, or both, or any NF for AI/ML. As such the expected CP to UP switch parameters may be used in the same manner regardless of whether they are provided by an AF, or defined in subscription information and provided to a NF in the 3GPP network (e.g., AMF, SMF, etc).

In an embodiment, the one or more expected CP to UP switch parameters may be sent, in any combination, to a UE and enforced at the UE.

For example, the following methods may be used for sending the one or more expected CP to UP switch parameters to a UE:

the UE may be preconfigured with the one or more expected CP to UP switch parameters;

the UE may receive the one or more expected CP to UP switch parameters via application layer signalling; and the UE may receive the one or more expected CP to UP switch parameters from the 3GPP communication network using any new or existing NAS procedure, the network may refer to any NF, such as, but not limited to, the AMF, SMF, UDM, etc, where any NAS message may be used for this purpose, the one or more expected CP to UP switch parameters may be received in any NAS container or policy container and may also be received from the HPLMN (e.g., UDM in HPLMN) in a secured manner.

The UE may enforce the one or more expected CP to UP switch parameters. The UE may enforce the one or more expected CP to UP switch parameters based on, for example, a certain time trigger or data volume trigger, etc. The UE may send a NAS message to request the CP to UP switch. The UE may return to CP data transmission after use of UP resource is complete or after any conditions as listed above are met. All of the one or more expected CP to UP switch parameters may be applied and enforced by the UE in any order and in any combination.

The procedures/steps defined in TS 23.502 (NEF service operations information flow) and/or the procedures/steps defined in TR 23.700-80, can be used in a similar manner for the exposure of the one or more expected CP to UP switch parameters defined herein. The same procedures/steps can apply for the provided one or more expected CP to UP switch parameters herein, where an AF may use these procedures/steps to provide the provided one or more expected CP to UP switch parameters and a network node may use the same procedures/steps to forward the one or more expected CP to UP switch parameters to other NFs accordingly (e.g., AMF, SMF, etc).

FIG. 1 illustrates one example for the one or more expected CP to UP switch parameters according to embodiments of the present disclosure.

Referring to FIG. 1, in step 0, the NF may transmit Nudm_SDM_Subscribe request to UDM. The NF may subscribe the UDM. In step 0b, the AF may subscribe and may receive from NWDAF UE mobility analytics and/or UE communication analytics (via NEF). In step 0c, the AF may validate the received data and derive expected UE behaviour parameters. In step 1, the AF may provide one or more parameter(s) to be created or updated, or deleted in a Nnef_ParameterProvision_Create or Nnef_ParameterProvision_Update or Nnef_ParameterProvision_Delete Request to the NEF.

In step 2, the NEF may request to create, update and store, or delete the provisioned parameters as part of the subscriber data via Nudm_ParameterProvision_Create, Nudm_ParameterProvision_Update or Nudm_ParameterProvision_Delete Request message.

In step 3, UDM may read from UDR, by means of Nudr_DM_Query, corresponding subscription information in order to validate required data updates and authorize these changes for this subscriber or Group for the corresponding AF.

In step 4, the UDM may request to create, update or delete the provisioned parameters as part of the subscriber data via Nudr_DM_Create/Update/Delete Request message, the message includes the provisioned data.

In step 5, UDM may respond the request with Nudm_ParameterProvision_Create/Update/Delete Response. If the procedure failed, the cause value indicates the reason.

In step 6, NEF may respond the request with Nnef_ParameterProvision_Create/Update/Delete Response. If the procedure failed, the cause value indicates the reason.

In step 7, the UDM may notify the subscribed Network Function (e.g., AMF) of the updated UE and/or Group subscription data via Nudm_SDM_Notification Notify message.

Referring to FIG. 1, the procedures/steps from TS 23.502 which can be re-used for the one or more expected CP to UP switch parameters that have been provided are shown. It should be noted that the "expected UE behaviour parameters" shown in FIG. 1 may represent any combination of the provided one or more expected CP to UP switch parameters and every step in FIG. 1 may also include any combination of the provided one or more expected CP to UP switch parameters. All the proposals herein may apply in any combination or order.

The one or more expected CP to UP switch parameters may be used to inform the 3GPP communication network about a CP to UP switch request by an AF of the network. The one or more expected CP to UP switch parameters may have values derived by an AF by subscribing to network data analytics function (NWDAF) analytics (see FIG. 1, steps 0a, 0b, and 0c). The disclosure herein, although explained with reference to UEs, also applies to AFs as well.

The one or more expected CP to UP switch parameters may be associated with any of an accuracy level, a probability level, a confidence level, an evaluation metric level used to indicate an accuracy of the one or more expected CP to UP switch parameters.

The one or more expected CP to UP switch parameters may be associated with any other metric that may indicate a type of confidence likelihood regarding a parameter. The probability or confidence level may be a single value or a range of values.

The 3GPP communication network may, for example, choose to use an expected CP to UP switch parameter based on any of an accuracy level, a probability level, a confidence level, an evaluation metric level. The level can be any of preconfigured in the network, part of a local network policy, part of subscription information.

When a SMF receives more than one expected CP to UP switch parameter per entry the SMF can, for example, choose one of the received expected CP to UP switch parameters based on any of an associated probability assertion, an evaluation metric received for each parameter, local network policies, subscription information.

Furthermore, any of the expected CP to UP switch parameters may be associated with a model that is used to indicate how the parameters are obtained. Each expected CP to UP switch parameter and/or model may be associated with at least one evaluation metric. The at least one evaluation metric may comprise any of accuracy, precision, recall, specificity, sensitivity, or any other evaluation metric. All of the proposals herein may be associated with such an evaluation metric. The at least one evaluation metric may be a single value or a range of values. When the AF sends a request with any expected CP to UP switch parameter, the request may also include at least one evaluation metric and/or confidence level or range/probability range. All the proposals herein may be associated with such information.

According to an embodiment, one or more network entities, such as a network function, a user equipment of a 3GPP communication network may use one or more expected CP to UP switch parameters which are one or more new parameters to inform the network about a CP to UP switch.

According to an embodiment, one or more network entities of a 3GPP communication network may use an expected CP to UP switch parameter to inform the network about an expected time of the CP to UP switch.

According to an embodiment, one or more network entities of a 3GPP communication network may include a UE which uses the expected CP to UP switch parameter to inform the network about an expected time when the UE of the network requests to switch from data transmission over the CP to data transmission over the UP.

According to an embodiment, one or more network entities of a 3GPP communication network may include a UE which uses the expected CP to UP switch parameter to inform the network about a time when the UE which is using CP CIoT 5GS optimization or sending data over the CP switches to the UP or vice versa.

According to an embodiment, the one or more expected CP to UP switch parameters may be exposed.

According to an embodiment, one or more network entities of a 3GPP communication network may include an AF which provides the one or more expected CP to UP switch parameters to the network.

According to an embodiment, one or more network entities of a 3GPP communication network may include an AI/ML AF which provides the one or more expected CP to UP switch parameters as part of AI/ML assisted parameters.

According to an embodiment, one or more network entities of a 3GPP communication network according to any preceding claim may include an SMF which uses the one or more expected CP to UP switch parameters to determine when a switch from CP to UP may be requested for communication.

According to an embodiment, one or more network entities of a 3GPP communication network may include an AF, which provisions an expected CP to UP switch parameter and CP CIoT 5GS Optimisation is enabled, an SMF of the network leverages the provisioned parameter to optimize the timing of a switch to UP transmission by triggering a N3 data transfer establishment procedure.

According to an embodiment, the one or more expected CP to UP switch parameters are associated with any of an accuracy level, a probability level, a confidence range level, an evaluation metric level used to indicate an accuracy of the one or more expected CP to UP switch parameters.

According to an embodiment, the network may choose to use an expected CP to UP switch parameter based on any of the accuracy level, the probability level, the confidence range level, the evaluation metric level.

According to an embodiment, the level may be any of preconfigured in the network, part of a local network policy, part of subscription information.

According to an embodiment, two or more expected CP to UP switch parameters per entry may be received by an SMF of the network and the SMF chooses one of the received expected CP to UP switch parameters based on any of an associated probability assertion, an evaluation metric received for each parameter, local network policies, subscription information.

According to an embodiment, one or more of the expected CP to UP switch parameters may include a set of parameters which provide the network with information about the CP to UP switch.

According to an embodiment, one or more network entities of a 3GPP communication network may include any of an AMF, an SMF, an AMF and an SMF, a new NF for A/ML, a CN function node.

FIG. 2 illustrates an example method performed by a node according to embodiments of the present disclosure. The method is for illustration only and other embodiments can be used without departing from the scope of the present disclosure.

According to an embodiment, in operation 210, the node may receive a CP-UP switch parameter (or expected CP-UP switch parameter). In operation 220, the node may determine an expected time where a UE may request to switch from CP to UP for data transmission. In other words, the expected time may be a time when the UE may be expected to request to switch from data transmission over CP to data transmission over UP. The determination may be based on the CP-UP switch parameter.

Figure 3:
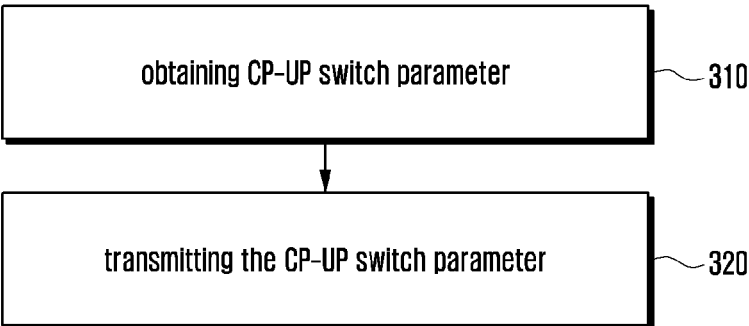
FIG. 3 illustrates an example of method performed by a node according to embodiments of the present disclosure.

FIG. 3 illustrates an example method performed by a node according to embodiments of the present disclosure. The method is for illustration only and other embodiments can be used without departing from the scope of the present disclosure.

According to an embodiment, in operation 310, the node may derive a CP-UP switch parameter (or expected CP-UP switch parameter). The CP-UP switch parameter may indicate and/or may be used for an expected time where a UE may request to switch from CP to UP for data transmission. In operation 320, the node may transmit the CP-UP switch parameter.

Figure 4:
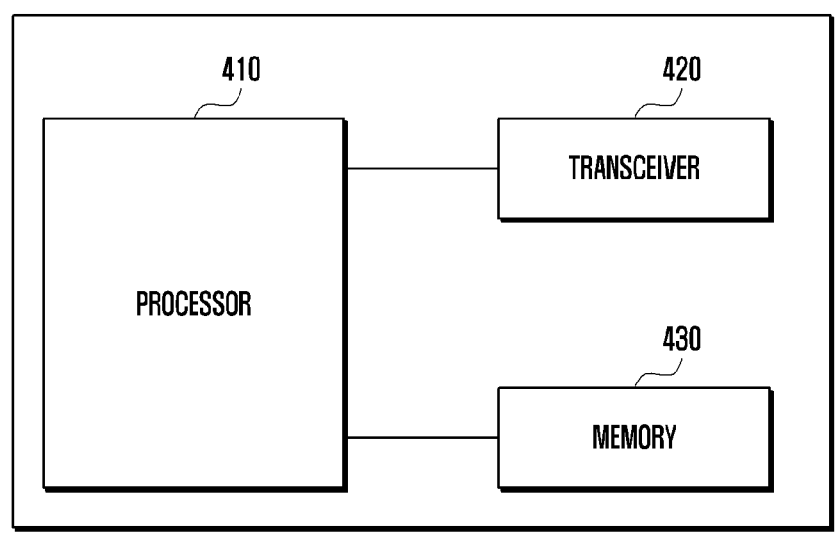
FIG. 4 illustrates an electronic device according to embodiments of the present disclosure.

FIG. 4 illustrates an electronic device according to embodiments of the present disclosure.

Referring to the FIG. 4, the electronic device 400 may include a processor 410, a transceiver 420 and a memory 430. However, all of the illustrated components are not essential. The electronic device 400 may be implemented by more or less components than those illustrated in FIG. 4. In addition, the processor 410 and the transceiver 420 and the memory 430 may be implemented as a single chip according to another embodiment.

The electronic device 400 may correspond to the UE described above.

The aforementioned components will now be described in detail.

The processor 410 may include one or more processors or other processing devices that control the provided function, process, and/or method. Operation of the electronic device 400 may be implemented by the processor 410.

The transceiver 420 may include a RF transmitter for up-converting and amplifying a transmitted signal, and a RF receiver for down-converting a frequency of a received signal. However, according to another embodiment, the transceiver 420 may be implemented by more or less components than those illustrated in components.

The transceiver 420 may be connected to the processor 410 and transmit and/or receive a signal. The signal may include control information and data. In addition, the transceiver 420 may receive the signal through a wireless channel and output the signal to the processor 410. The transceiver 420 may transmit a signal output from the processor 410 through the wireless channel.

The memory 430 may store the control information or the data included in a signal obtained by the electronic device 400. The memory 430 may be connected to the processor 410 and store at least one instruction or a protocol or a parameter for the provided function, process, and/or method. The memory 430 may include read-only memory (ROM) and/or random access memory (RAM) and/or hard disk and/or CD-ROM and/or DVD and/or other storage devices.

Figure 5:
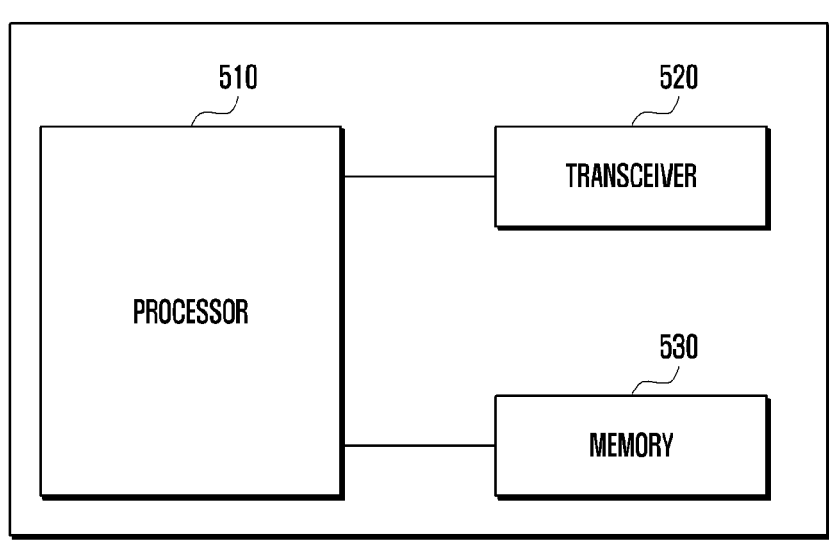
FIG. 5 illustrates an electronic device according to embodiments of the present disclosure.

FIG. 5 illustrates a base station according to embodiments of the present disclosure.

Referring to the FIG. 5, the base station 500 may include a processor 510, a transceiver 520 and a memory 530. However, all of the illustrated components are not essential. The base station 500 may be implemented by more or less components than those illustrated in FIG. 5. In addition, the processor 510 and the transceiver 520 and the memory 530 may be implemented as a single chip according to another embodiment.

The base station 500 may correspond to the base station and/or the network entity and/or network function described above.

The aforementioned components will now be described in detail.

The processor 510 may include one or more processors or other processing devices that control the provided function, process, and/or method. Operation of the base station 500 may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the base station 500. The memory 530 may be connected to the processor 510 and store at least one instruction or a protocol or a parameter for the provided function, process, and/or method. The memory 530 may include read-only memory (ROM) and/or random access memory (RAM) and/or hard disk and/or CD-ROM and/or DVD and/or other storage devices.

Certain examples of the present disclosure provide a network or wireless communication system comprising a first network entity and a second network entity according to any example, embodiment, aspect and/or claim disclosed herein.

Certain examples of the present disclosure provide a computer program comprising instructions which, when the program is executed by a computer or processor, cause the computer or processor to carry out a method according to any example, embodiment, aspect and/or claim disclosed herein.

Certain examples of the present disclosure provide a computer or processor-readable data carrier having stored thereon a computer program according to the preceding examples.

Certain examples of the present disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the present disclosure may be provided in the form of a system (e.g., a network) comprising one or more such apparatuses/devices/network entities, and/or a method therefor. For example, in the following examples, a network may include one or more IAB nodes.

It will be appreciated that examples of the present disclosure may be realized in the form of hardware, software or a combination of hardware and software. Certain examples of the present disclosure may provide a computer program comprising instructions or code which, when executed, implement a method, system and/or apparatus in accordance with any aspect, claim, example and/or embodiment disclosed herein. Certain embodiments of the present disclosure provide a machine-readable storage storing such a program.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but are merely used to enable a clear and consistent understanding of the examples disclosed herein.

Throughout the description and claims, the words "comprise," "contain" and "include," and variations thereof, for example "comprising," "containing" and "including," means "including but not limited to," and is not intended to (and does not) exclude other features, elements, components, integers, steps, processes, functions, characteristics, and the like.

Throughout the description and claims, the singular form, for example "a," "an" and "the," encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

While the present disclosure has been shown and described with reference to certain examples, it will be understood by those skilled in the art that various changes in form and detail may be made therein without departing from the scope of the present disclosure, as defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network function in a communication system, the method comprising:

transmitting, to a unified data management (UDM), a request message associated with requesting at least one artificial intelligence/machine learning (AI/ML) assisted parameter corresponding to expected user equipment (UE) behaviour; and receiving, from the UDM, a notify message associated with the at least one AI/ML assisted parameter, wherein the at least one AI/ML assisted parameter includes an expected CP to UP switch parameter corresponding to an expected time when a UE requests to switch from data transmission over a control plane (CP) to data transmission over a user plane (UP).

2. The method of claim 1, wherein the at least one AI/ML assisted parameter is received from an AI/ML application function, via the UDM in the notify message.

3. The method of claim 1, wherein the network function is a session management function (SMF).

4. The method of claim 1, wherein, in case that a plurality of expected CP to UP switch parameters are received, one of the plurality of expected CP to UP switch parameters is identified based on at least one of a probability level or an accuracy level.

5. An apparatus corresponding to a network function in a communication system, the apparatus comprising:

a transceiver; and a processor coupled with the transceiver and configured to:

transmit, to a unified data management (UDM), a request message associated with requesting to be notified about artificial intelligence/machine learning (AI/ML) assisted parameter corresponding to expected user equipment (UE) behaviour; and receive, from the UDM, a notify message associated with the at least one AI/ML assisted parameter, wherein the at least one AI/ML assisted parameter includes an expected CP to UP switch parameter corresponding to an expected time when a UE requests to switch from data transmission over a control plane (CP) to data transmission over a user plane (UP).

6. The apparatus of claim 5, wherein the at least one AI/ML assisted parameter is received from an AI/ML application function, via the UDM in the notify message.

7. The apparatus of claim 5, wherein the network function is a session management function (SMF).

8. The apparatus of claim 5, wherein, in case that a plurality of expected CP to UP switch parameters are received, one of the plurality of expected CP to UP switch parameters is identified based on at least one of a probability level or an accuracy level.

9. A method performed by a unified data management (UDM) in a communication system, the method comprising:

receiving, from a network function, a request message associated with requesting at least one artificial intelligence/machine learning (AI/ML) assisted parameter corresponding to expected user equipment (UE) behaviour;

after receiving the request message, receiving, from an AI/ML application function, the at least one artificial intelligence/machine learning (AI/ML) assisted parameter; and transmitting, to the network function, a notify message associated with the at least one AI/ML assisted parameter, wherein the at least one AI/ML assisted parameter includes an expected CP to UP switch parameter corresponding to an expected time when a UE requests to switch from data transmission over a control plane (CP) to data transmission over a user plane (UP).

10. The method of claim 9, wherein the network function is a session management function (SMF).

11. An apparatus corresponding to a unified data management (UDM) in a communication system, the apparatus comprising:

a transceiver; and a processor coupled with the transceiver and configured to:

receive, from a network function, a request message associated with requesting at least one artificial intelligence/machine learning (AI/ML) assisted parameter corresponding to expected user equipment (UE) behaviour;

after receiving the request message, receive, from an AI/ML application function, the at least one artificial intelligence/machine learning (AI/ML) assisted parameter; and transmit, to the network function, a notify message associated with the at least one AI/ML assisted parameter, wherein the at least one AI/ML assisted parameter includes an expected CP to UP switch parameter corresponding to an expected time when a UE requests to switch from data transmission over a control plane (CP) to data transmission over a user plane (UP).

12. The apparatus of claim 11, wherein the network function is a session management function (SMF).

* * * * *